United States Patent [19]

Hermsdorf et al.

[11] 4,209,982
[45] Jul. 1, 1980

[54] LOW TEMPERATURE FLUID ENERGY CONVERSION SYSTEM

[75] Inventor: Clyde T. Pitts, Sierra Vista, Ariz.

[73] Assignee: Arthur W. Fisher, III, Tampa, Fla.

[21] Appl. No.: 894,136

[22] Filed: Apr. 6, 1978

[30] Foreign Application Priority Data

Apr. 7, 1977 [GB] United Kingdom ............... 14910/77

[51] Int. Cl.² ............................................. F03G 7/06
[52] U.S. Cl. ....................................... 60/325; 60/516; 60/682; 417/92; 417/97; 417/98
[58] Field of Search ................. 60/516, 649, 673, 650, 60/682, 721, 325, 641, 508–515; 417/92, 97, 98; 122/31

[56] References Cited

U.S. PATENT DOCUMENTS

| | | | |
|---|---|---|---|
| 456,595 | 7/1891 | Popp | 60/649 |
| 3,608,311 | 9/1971 | Roesel, Jr. | 60/516 |
| 3,901,033 | 8/1975 | McAllister | 60/516 |
| 3,938,335 | 2/1976 | Marwick | 417/92 X |

Primary Examiner—Allen M. Ostrager
Attorney, Agent, or Firm—Arthur W. Fisher, III

[57] ABSTRACT

A low temperature fluid energy conversion system in which at least two cylinders containing a working fluid which has been heated, for example by solar energy, are alternately supplied with a liquid expanding agent, preferably a hydrocarbon or a fluorocarbon whereby the heat from the working liquid in one cylinder causes vaporization and consequential expansion of the liquid expanding agent which, in turn, forces the working liquid from said one cylinder through a generator or the like device and then to the other cylinder, the cycle then being reversed to return the working liquid to the one cylinder again by way of said generator.

7 Claims, 1 Drawing Figure

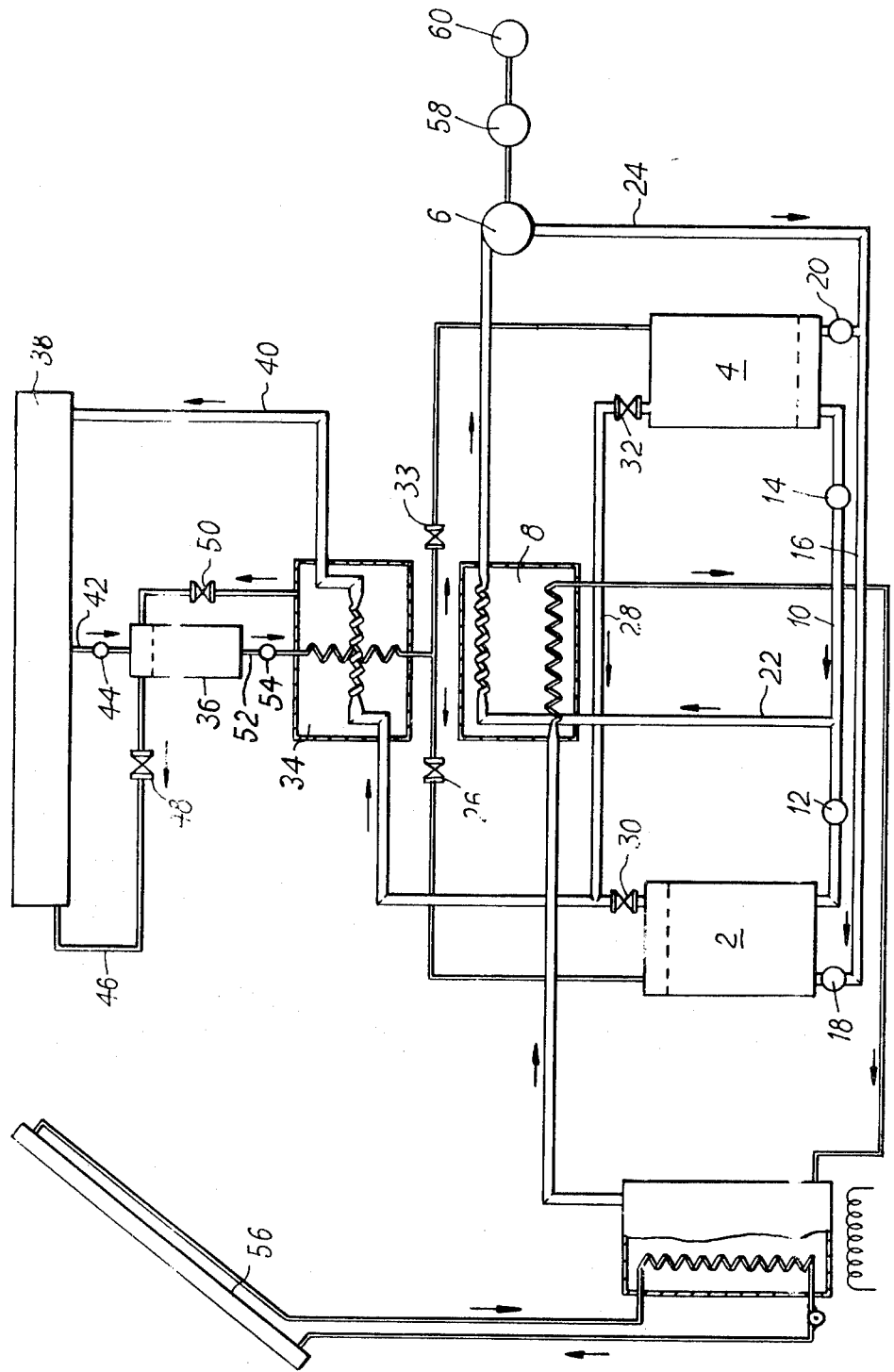

LOW TEMPERATURE FLUID ENERGY CONVERSION SYSTEM

BACKGROUND OF THE INVENTION

1. Field of the Invention

This invention relates to low temperature fluid energy conversion systems, and more particularly to such systems incorporating hydraulically-operated transducers, for example turbines.

2. Description of the Prior Art

Over the past few centuries, one of the continuing goals of technology has been the improvement of systems for converting energy in the form of heat into mechanical motion. The widely employed conventional steam engine and internal combustion engine are the products of this continued effort. Neither of these engines is, however, completely satisfactory. Both are complicated heavy machines whose efficiency in accomplishing the energy conversion is normally quite low. The internal combustion engine produces pollutants which are both dangerous and obnoxious.

One promising heat conversion apparatus which has been developed includes a tank containing a working fluid and a fluid motor operatively connected to the tank so that when heat is added to the system a pressure is generated on the fluid in the tank which forces it out the tank and through the motor, thus generating a mechanical output. A second tank can be added to the system so that the fluid after passage through the motor can refill that tank. When the second tank is full, pressure can be generated on the fluid in that tank to force fluid flow out of the second and through the motor to refill the first.

Unfortunately these systems generally require high temperature vapour generators resulting in low efficiency.

Such systems are shown, for example, in U.S. Pat. Nos. 2,688,923, 3,234,734, 3,512,357, 3,608,311, 3,611,723, 3,648,458, 3,695,036, 3,795,103, 3,803,847, and in U.K. patent specifications Nos. 360,388, 765,236, 1,266,662, 1,335,419 and 1,379,631.

SUMMARY OF THE INVENTION

According to the present invention there is provided a low temperature fluid energy conversion system comprising a primary circuit for a working liquid, said circuit including at least two chambers one of which contains working liquid when the other is substantially empty, means for heating said working liquid, and a rotary transducer to be driven by said working liquid, the system further comprising a secondary circuit for a liquid expanding agent, said primary and secondary circuits being interconnected in such a manner that, in use, said working liquid is heated and liquid expanding agent is fed under hydrostatic pressure alternately to said one and other chamber, said agent, on entering the one chamber containing heated working liquid, expanding and forcing the working liquid therein from the first chamber to drive the rotary transducer and thence into the other chamber until a predetermined level is said other chamber is reached at which point the cycle is reversed, the liquid agent being fed to the other chamber to return the working liquid through, to drive, the transducer and thence into the one chamber thereby to expel from said one chamber the gaseous expanding agent therein which is returned to the secondary circuit and condensed back to liquid.

The liquid expanding agent may be, for example, a hydrocarbon or a fluorocarbon, the chloro-fluorocarbons F11 and F12 being the preferred agents. The working liquid may be, for example, water, although the more dense the liquid the more efficient will be the system.

Conveniently the heat for the working liquid is obtained from solar energy, fossil fuel or waste heat from industry.

An additional chamber may be incorporated in the primary circuit to supply working liquid to the rotary transducer during reversal of the cycle and to ensure continuous, uninterrupted power from said transducer. Alternatively, or additionally, the rotary transducer may incorporate a flywheel.

Preferably the secondary circuit includes a condenser to which the gaseous expanding agent is fed for conversion back to liquid, said condenser being located above a first container and said first container being located above a further container through which the gaseous expanding agent flows en route to the condenser, the secondary circuit incorporating flow control means so arranged that the first container can be interconnected with, to equalize in pressure with, the relatively low pressure condenser whereby liquid expanding agent flows under hydrostatic pressure from said condenser to the first container until a predetermined level in said container is reached, the first container then being disconnected from the condenser and interconnected with, to equalize in pressure with, the relatively high pressure further container whereby liquid expanding agent then flows under hydrostatic pressure from the first container through the further container alternately to the one and the other chambers, the liquid expanding agent being preheated by the gaseous expanding agent in its passage through said further container.

By way of example only, an embodiment of the invention will now be described in greater detail with reference to the accompanying drawing which shows a low temperature fluid energy conversion system according to the invention.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is a detailed schematic view of the low temperature fluid energy conversion system.

Similar reference characters refer to similar parts throughout the several views of the drawings.

DETAILED DESCRIPTION OF THE PREFERRED EMBODIMENT

Referring to the drawing, the illustrated system includes a primary circuit for a working liquid such as water, said circuit incorporating a pair of cylinders 2, 4, a turbine 6 and a heat exchanger 8. The system further includes a secondary circuit for a liquid expanding agent such as trichlorofluoromethane known as Freon 11, said secondary circuit being interconnected with the primary circuit in a manner best understood from considering operation of the system which is as follows:

Initially, cylinder 2 is substantially full of heated water, while cylinder 4 is substantially empty. The lower regions of the cylinders 2, 4 are joined by a first pipe 10 containing a pair of pressure-sensitive check valves 12, 14 and a second pipe 16 containing a further pair of pressure-sensitive check valves 18, 20.

From an intermediate point along pipe 10 extends a branch pipe 22 passing through the heat exchanger 8 to the inlet of the turbine 6, a further pipe 24 extending from the outlet from said turbine to the pipe 16.

At the start of a cycle, a predetermined quantity of hot liquid Freon 11 is fed through a solenoid valve 26 into the relatively low pressure upper regions of cylinder 2, the hot water in said cylinder causing said Freon 11 to expand instantly. The pressure exerted by the gaseous Freon 11 on the water in said cylinder 2 forces water through valve 12, branch pipe 22, heat exchanger 8 to the turbine 6 which is driven by said water, the check valves 14 and 18 being closed due to the pressures applied thereacross.

The secondary circuit, which will be described in more detail below, includes a pipe 28 interconnecting the upper regions of the cylinders 2, 4 and incorporating a pair of electrically-operated control valves 30, 32, one associated with each cylinder.

During flow of water from cylinder 2 to cylinder 4 via turbine 6, valve 30 is closed and valve 32 is open to permit any gaseous expanding agent to be expelled from cylinder 4, again as will be detailed below. Said flow continues until a predetermined level of water in cylinder 4 is reached. At this level, an electric switch is triggered which closes valve 32, opens valve 30, and opens a further solenoid valve 33, valve 26 having been previously closed once the predetermined quantity of Freon 11 had been fed to cylinder 2. A predetermined quantity of hot liquid Freon 11 is then fed to cylinder 4 instead of cylinder 2, and valve 33 subsequently closed.

Thus the liquid Freon 11 expands on entering cylinder 4, which now contains hot water, said water being forced from the lower regions of said cylinder through valve 14, which is now open while valve 12 is closed, through branch pipe 22, heat exchanger 8 and turbine 6 to drive said turbine in the same direction as during the first part of the cycle. Water from the turbine flows along pipe 16 to enter the lower regions of cylinder 2 by way of valve 18, which is now open, valve 20 being closed.

During flow of water from cylinder 4 to cylinder 2, the gaseous Freon 11 in cylinder 2 is forced out by the incoming water through valve 30 into the secondary circuit. Said circuit includes a heat recovery unit 34 above which is located a container 36, a low pressure condenser 38 being located above said container 36. The hot gas flows through the unit 34, the interior of which is thus at a relatively high pressure, typically 75 p.s.i. and through a pipe 40 to the condenser 38 where it is condensed back to liquid. The pressure in the condenser is typically 10 p.s.i.

An outlet from the condenser 38 is connected to the upper regions of the container 36 by way of a pipe 42 incorporating a check valve 44, a return path 46 from the container 36 to the condenser 38 incorporating a solenoid valve 48.

The upper regions of the container 36 are in communication with the interior of the unit 34 through a solenoid valve 50, while a pipe 52 incorporating a check valve 54 extends from the bottom of the container 36 through the unit 34 to supply liquid Freon 11 alternately through solenoid valves 26 and 33 to the cylinders 2 and 4.

More particularly, the container 36 and its associated solenoid valve and check valves acts as a hydrostatic transfer device which enables a liquid (the liquid expanding agent) to be moved from a region of low pressure (the condenser 38) to a region of higher pressure (the unit 34) without the use of pumps or the like. Although the operation of this device will now be described in relation to a system according to the invention, it will be appreciated that such a device has many other applications, for example in air-conditioning units and in supplying feed water to boilers.

When controlling the supply of liquid expanding agent to the cylinders 2, 4, the device operates as follows:

With solenoid valve 50 closed, check valve 54 closed by back pressure from the high pressure unit 34, solenoid valve 48 open and check valve 44 open, container 36 is isolated from the high pressure system and the pressure in container 36 equalizes with that in the condenser 38 (typically 10 p.s.i.) and liquid Freon 11 flows under hydrostatic pressure from condenser 38 through pipe 42 and check valve 44 into container 36. As liquid enters the container 36, any surplus vapours, gas or steam from the previous cycle remaining in the container are forced out through solenoid valve 48 and along path 46 to the condenser 38. Flow into container 36 continues until a predetermined level in said container is reached, at which point a trigger device is actuated to close valve 48 and to open valve 50. As a result of the pressure change in the system, valves 44 and 54 change their states, valve 44 closing and valve 54 opening. Thus container 36 is isolated from the low pressure condenser 38. The pressure in container 36 then equalizes with the high pressure in unit 34 as high pressure vapor flows from said unit into the upper regions of container 36 through valve 50. Thus liquid Freon 11 flows under hydrostatic pressure from container 36 through pipe 52 and through the unit 34. When liquid in container 34 falls below the level of the triggering device, said device closes valve 50 and opens valve 48; pressure in the container 36 begins to drop and check valves 44 and 54 again reverse their positions. The cycle repeats itself at desired intervals.

The liquid, in its passage through unit 34, is heated by the hot vapor therein thus increasing the efficiency of the system.

It will be appreciated that such an arrangement enables liquid to flow from a low pressure volume (the condenser 38) to a high pressure volume (the unit 34) purely under hydrostatic pressure and regardless of the pressure in said latter volume, thus obviating the necessity for electric pumps and the like.

Such a hydrostatic transfer device has a number of advantages in that:

it requires no internal or external seals, thereby minimizing maintenance and the possibility of leaks;

it requires far less power than conventional pumps and the like, as solenoid valves require very small quantities of electricity and can readily be converted to operate from pneumatic or hydraulic pressure;

it does not require internal lubrication and can handle liquids that are non-lubricating such as fluorocarbons and hydrocarbons;

it incorporates a minimum of moving parts, thereby reducing maintenance costs and eliminating friction heat which contributes to the cause of cavitation in conventional pumps when handling fluorocarbons and hydrocarbons;

it is far less expensive to construct than conventional devices, in that it consists only of a hollow vessel, two check valves, two solenoid valves and an inexpensive triggering device.

Once the cycle is under way, which cycle is synchronised by an electrical timing device, the filling of a cylinder 2 or 3 with hot water is accompanied by hot Freon 11 vapor being expelled from the associated cylinder.

The water in the primary circuit is heated, for example, by means of a solar collector 56 or fossil fuels or waste heat from industry, while any heat expelled from the condenser 38 may be used for, for example, space heating.

The turbine 6 may be used to power, for example, an electrical generator 58 or a land irrigation pump 60.

Liquid turbines such as 6 are more efficient than gas turbines in that the former turbines make use of the potential energy as well as the kinetic energy of the working fluid, and do not run at such a high speed, therefore eliminating the requirement for transmission gearing to gear the output down.

The system may incorporate more than two cylinders such as 2 and 4 and may incorporate a 'changeover' cylinder for supplying working fluid to the turbine 6 on reversal of the operating cycle of the cylinders 2, 4. Alternatively or additionally, the turbine 6 may incorporate a heavy flywheel to maintain speed at said change-over.

It will thus be seen that the objects set forth above, among those made apparent from the preceding description are efficiently attained and since certain changes may be made in the above construction without departing from the scope of the invention, it is intended that all matter contained in the above description or sown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A low temperature fluid energy conversion system comprising a primary circuit including a first and second cylinder for containing a working fluid, a heat exchange means coupled through a working fluid supply means to said first and second cylinder alternately to receive said working fluid from said first and second cylinder to heat said working fluid, a motor means operatively coupled to said heat exchange means to receive said working fluid therefrom to generate mechanical energy thereby, and a working fluid return means coupled between said motor means and said first and second cylinders alternately to return said working fluid to said first and second cylinder, a secondary circuit including a liquid expansion agent supply means coupled to said first and second cylinders to supply said liquid expansion agent to said first and second cylinder such that, as said liquid expansion agent is alternately supplied to said first and second cylinder, the heat from said working fluid within said first and second cylinder vaporizes said liquid expansion agent forcing said working fluid from said first and second cylinder to said heat exchange means, a vapor expansion agent return means coupled between said first and second cylinders and said liquid expansion agent supply means alternately to return said vapor expansion agent to said liquid expansion agent supply means.

2. The low temperature fluid energy conversion system of claim 1 wherein said working fluid supply means comprises a working fluid supply conduit coupled between said first and second cylinders and said heat exchange means, and a first and second working fluid supply flow control means each operable in a first and second state alternately to supply said working fluid from said first and second cylinders to said heat exchange means such that, when said first working fluid supply flow control means is in said first state and said second working fluid supply control means is in said second state, said working fluid is supplied from said first cylinder to said heat exchange means, and, when said first working fluid supply flow control means is in said second state and said second working fluid supply flow control means is in said first state, said working fluid is supplied from said second cylinder to said heat sechange means.

3. The low temperature fluid energy conversion system of claim 2 wherein said working fluid return means comprises a working fluid return conduit coupled between said first and second cylinders and said motor means, and a first and second working fluid return flow control means each operable in a first and second state alternately to supply said working fluid from said motor means to said first and second cylinders such that, when said first working fluid supply flow control means is in said first state, said second working fluid return flow control means is in said first state and said working fluid is returned to said second cylinder, and such that, when said second working fluid supply flow control means is in said first position, said first working fluid return flow control means is in said first position and said working fluid is returned to said first cylinder.

4. The low temperature fluid energy conversion system of claim 3 wherein said liquid expansion agent supply means comprises a liquid expansion agent supply conduit coupled between said liquid expansion agent supply means and said first and second cylinders and a first and second liquid expansion agent supply flow control means each operable in a first and second state alternately to supply said liquid expansion agent to said first and second cylinders such that, when said first working fluid supply flow control means is in said first state, said first liquid expansion agent flow control means is in said first state and said second liquid expansion agent supply flow control means is in said second state to supply said liquid expansion agent to said first cylinder, and such that, when said second working fluid supply flow control means in in said first state, said first liquid expansion agent supply flow control means is in said second state and said first liquid expansion agent supply flow control means is in said first state to supply said liquid expansion agent to said second cylinder.

5. The low temperature fluid energy conversion system of claim 4 wherein said vapor expansion agent return means comprises a vapor expansion agent conduit coupling said first and second cylinders and said liquid expansion agent supply means, and a first and second vapor expansion agent return flow control means each operable between a first and second state alternately to supply vapor expansion agent to said liquid expansion agent supply means from said first and second cylinders such that, when said second working fluid supply flow control means is in said second state, said first vapor expansion agent return flow control means is in said second state and said second vapor expansion agent return flow control means is in said first state and said second vapor expansion agent return flow control means is in said second state, said vapor expansion agent is returned to said liquid expansion agent supply means.

6. The low temperature fluid energy conversion system of claim 1 wherein said liquid expansion agent supply means comprises a low pressure condenser to liquify said vaporized expansion agent returned from said primary circuit and a heat recovery unit coupled between said low pressure condenser and said primary circuit to preheat said liquid expansion agent supplied to said primary circuit through said heat recovery unit with said vaporized expansion agent returned from said primary circuit.

7. The lower temperature fluid energy conversion system of claim 6 wherein said liquid expansion agent supply means further comprises a pressure equalization chamber coupled between said heat recovery unit and said low pressure condenser, said low pressure condenser and said pressure equalization chamber being coupled through a first and second condenser conduit including a first and second condenser flow control means respectively each having a first and second state, said pressure equalization chamber further including a fluid level control coupled to said first and second condenser flow control means, said pressure equalization chamber and said heat recovery unit being coupled through a first and second heat recovery unit conduit including a first and second heat recovery unit flow control means respectively each having a first and second state, said first and second heat recovery unit flow control means each being operatively coupled to said fluid level control such that, initially, said first and second condenser flow control means are in said first state and said first and second heat recovery unit flow control means are in said second state to isolate said heat recovery unit from said pressure equalization chamber whereby pressure is equalized between said low pressure condenser and said pressure equalization chamber to supply hydrostatically said liquid expansion agent to said pressure equalization chamber until, at a predetermined level of liquid expansion agent within said pressure equalization chamber, said fluid level control changes said first and second condenser flow control means to said second state to isolate said low pressure condenser from said pressure equalization chamber and change said first and second heat recovery unit flow control means to said first state whereby pressure is equalized between said pressure equalization chamber and said heat recovery unit, high pressure vapors then flowing from said heat recovery unit to said pressure equalization chamber and said liquid expansion agent flowing hydrostatically from said pressure equalization chamber through said heat recovery unit to preheat said liquid expansion agent supplied to said primary circuit.

* * * * *